US012380644B2

(12) United States Patent
Nolan et al.

(10) Patent No.: US 12,380,644 B2
(45) Date of Patent: *Aug. 5, 2025

(54) THREE-DIMENSIONAL IMAGE SPACE TRANSFORMATION

(71) Applicant: Sphere Entertainment Group, LLC, New York, NY (US)

(72) Inventors: William Andrew Nolan, Los Angeles, CA (US); Michael Romaszewicz, Brooklyn, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,005

(22) Filed: Mar. 11, 2024

(65) Prior Publication Data

US 2024/0212273 A1 Jun. 27, 2024

Related U.S. Application Data

(63) Continuation of application No. 17/482,503, filed on Sep. 23, 2021, now Pat. No. 11,961,181.

(51) Int. Cl.
*G06T 17/00* (2006.01)
(52) U.S. Cl.
CPC ........ *G06T 17/00* (2013.01); *G06T 2219/012* (2013.01)

(58) Field of Classification Search
CPC ... G06T 17/00; G06T 2219/012; G06T 15/10; G06T 3/00
USPC ......................................................... 382/154
See application file for complete search history.

(56) References Cited

U.S. PATENT DOCUMENTS

| 11,200,734 B2 * | 12/2021 | Huang ................. H04N 23/698 |
| 2017/0032563 A1 * | 2/2017 | Distler .................... G06T 15/04 |
| 2021/0125358 A1 * | 4/2021 | Himann ................. G06T 19/20 |
| 2023/0093097 A1 | 3/2023 | Nolan et al. |

* cited by examiner

*Primary Examiner* — Neil R McLean
(74) *Attorney, Agent, or Firm* — Sterne, Kessler, Goldstein & Fox P.L.L.C.

(57) ABSTRACT

A three-dimensional image transformation, executing on one or more computer systems, can mathematically transform a first two-dimensional image space onto a second two-dimensional image space using a three-dimensional image space. The three-dimensional image transformation can project the three-dimensional image space onto the first two-dimensional image space to map the first two-dimensional image space to the three-dimensional image space. Thereafter, the three-dimensional image transformation can project the second two-dimensional image space onto the three-dimensional image space to map the three-dimensional image space to the second two-dimensional image space.

20 Claims, 6 Drawing Sheets

THREE-DIMENSIONAL IMAGE SPACE TRANSFORMATION

CROSS-REFERENCE TO RELATED APPLICATIONS

This application is a continuation of U.S. patent application Ser. No. 17/482,503, filed Sep. 23, 2021, now U.S. Pat. No. 11,961,181, which is incorporated herein by reference in its entirety.

BACKGROUND

The United States Media and Entertainment Industry is the largest in the world. The United States Media and Entertainment Industry represents a third of the global media and entertainment industry which delivers events, such as musical events, theatrical events, sporting events, and/or motion picture events, to an audience for their viewing pleasure. Often times, an event combines many different graphical elements, such as images and/or videos to provide some examples, to enhance the immersion of the audience as they are viewing the event. For example, one or more computer-generated images, such as computer-generated special effects to provide an example, can be combined with a video of the event to enhance the immersion of the audience as they are viewing the event. Often times, the computer-generated images and the video of the event are in different image formats, also referred to as image spaces. For example, the computer-generated images are often created in a two-dimensional equirectangular image space and the video of the event is often rendered onto a two-dimensional fisheye image space. This typically requires the video of the event to be converted from the two-dimensional fisheye image space into the two-dimensional equirectangular image space before being combined with the computer-generated images in the two-dimensional equirectangular image space.

BRIEF DESCRIPTION OF THE DRAWINGS/FIGURES

The accompanying drawings, which are incorporated herein and form a part of the specification, illustrate the present disclosure and, together with the description, further serve to explain the principals thereof and to enable a person skilled in the pertinent art to make and use the same. Aspects of the present disclosure are best understood from the following detailed description when read with the accompanying figures. It is noted that, in accordance with the standard practice in the industry, features are not drawn to scale. In fact, the dimensions of the features may be arbitrarily increased or reduced for clarity of discussion. In the drawings.

In the accompanying drawings, like reference numbers indicate identical or functionally similar elements. Additionally, the left most digit(s) of a reference number identifies the drawing in which the reference number first appears.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the examples. This repetition does not in itself dictate a relationship between the embodiments and/or configurations discussed.

Overview

Conventionally, the different graphical elements as described above, such as images and/or videos to provide some examples, are directly transformed between various two-dimensional image spaces through a computerized process referred to as two-dimensional image projection. Image projection refers to a computerized process through which a computer system maps the different graphical elements from a first two-dimensional image space, such as the two-dimensional fisheye image, directly to a second two-dimensional image space, such as the two-dimensional equirectangular image space. However, instead of directly transforming the different graphical elements, such as images and/or videos to provide some examples, the three-dimensional image transformation of the present disclosure transforms two-dimensional coordinates of a first two-dimensional image space onto two-dimensional coordinates of a second two-dimensional image space using three-dimensional coordinates of a three-dimensional image space.

The three-dimensional image transformation, executing on one or more computer systems, can mathematically transform the first two-dimensional image space onto the second two-dimensional image space using the three-dimensional image space. The three-dimensional image transformation can project the three-dimensional image space onto the first two-dimensional image space to map the first two-dimensional image space to the three-dimensional image space. Thereafter, the three-dimensional image transformation can project the second two-dimensional image space onto the three-dimensional image space to map the three-dimensional image space to the second two-dimensional image space.

Exemplary Three-Dimensional Image Transformation

Figure 1:
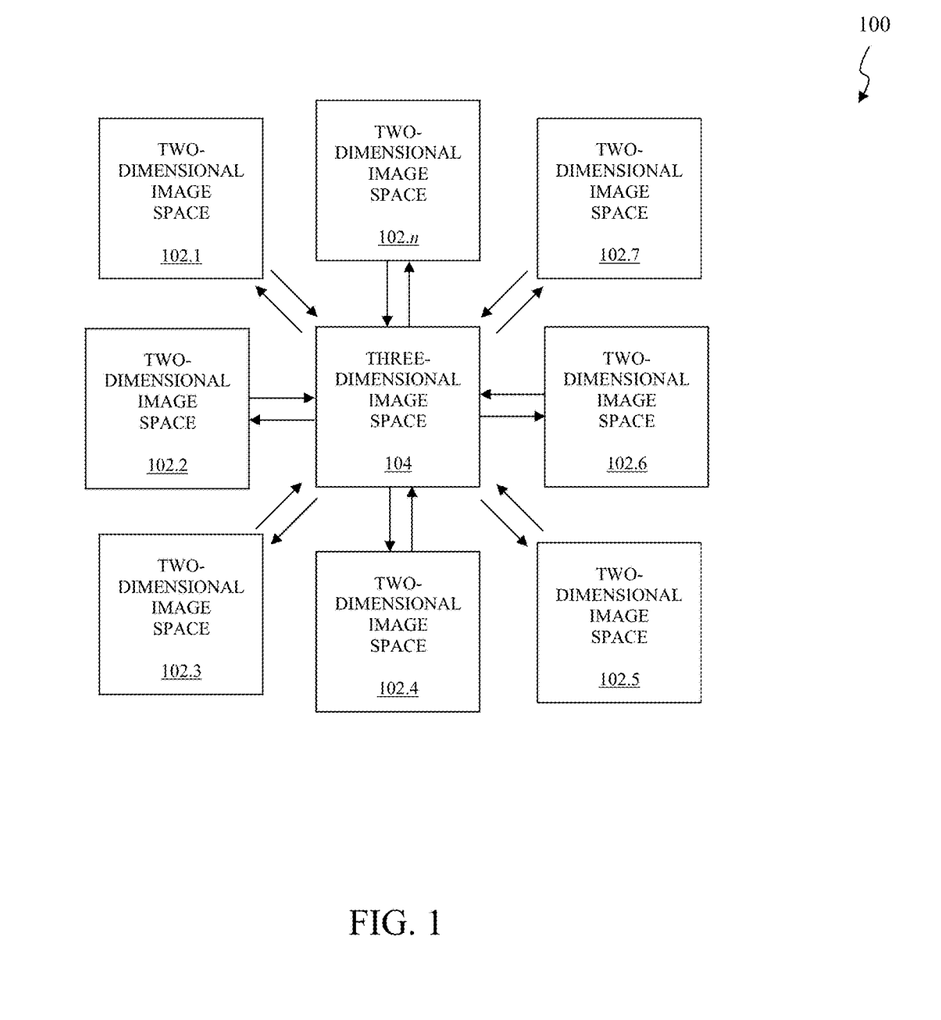
FIG. 1 graphically illustrates a pictorial representation of an exemplary three-dimensional image transformation in accordance with some exemplary embodiments of the present disclosure.

FIG. 1 graphically illustrates a pictorial representation of an exemplary three-dimensional image transformation in accordance with some exemplary embodiments of the present disclosure. In the exemplary embodiment illustrated in FIG. 1, a three-dimensional image transformation 100 can mathematically transform one or more two-dimensional coordinates of a first two-dimensional image space onto one or more two-dimensional coordinates of a second two-dimensional image space using one or more three-dimensional coordinates of a three-dimensional image space. As illustrated in FIG. 1, the three-dimensional image transformation 100, when executed by the one or more computer systems, can mathematically transform one or more two-dimensional coordinates $(uv.x_1, uv.y_1)$, $(uv.x_2, uv.y_2)$ . . . $(uv.x_n, uv.y_n)$, collectively referred to as two-dimensional coordinates uv.x, uv.y of a first two-dimensional image space from among two-dimensional image spaces 102.1 through 102.n onto one or more three-dimensional coordinates $(pos.x_1, pos.y_1, pos.z_1)$, $(pos.x_2, pos.y_2, pos.z_2)$, . . . $(pos.x_n, pos.y_n, pos.z_n)$, collectively referred to as three-dimensional coordinates pos.x, pos.y, and pos.z, of a three-dimensional image space 104. Thereafter, as illustrated in FIG. 1, the three-dimensional image transformation 100, when executed by the one or more computer systems, can mathematically transform the one or more three-dimensional coordinates pos.x, pos.y, and pos.z of the three-dimensional image space 104 onto one or more two-dimensional coordinates $(UV.x_1, UV.y_1)$, $(UV.x_2, UV.y_2)$, . . . $(UV.x_n, UV.y_n)$, collectively referred to as two-dimensional coordinates UV.x, Uv.y of a second two-dimensional image space from among two-dimensional image spaces 102.1 through 102.n. Those skilled in the relevant art(s) will recognize that the two-dimensional image spaces 102.1 through 102.n can include any suitable number of two-dimensional image spaces without departing from the spirit and scope of the present disclosure.

In some embodiments, the two-dimensional image spaces 102.1 through 102.n can include one or more two-dimensional equirectangular image spaces, one or more two-dimensional fisheye image spaces, one or more two-dimensional cubemap image spaces, one or more two-dimensional latitude/longitude image spaces and/or one or more suitable two-dimensional image spaces that will be recognized by those skilled in the relevant art(s) without departing from the spirit and scope of the present disclosure. In some embodiments, the three-dimensional image space 104 can include a three-dimensional cubic image space, a three-dimensional rectangular prism image space, a three-dimensional spherical image space, a three-dimensional conical image space, a three-dimensional cylindrical image space, and/or any suitable three-dimensional image space that will be recognized by those skilled in the relevant art(s) without departing from the spirit and scope of the present disclosure. In these embodiments, the three-dimensional image space 104 can include a portion of any of these three-dimensional image spaces, such as a hemispherical structure, also referred to as a dome, that will be recognized by those skilled in the relevant art(s) without departing from the spirit and scope of the present disclosure.

As illustrated in FIG. 1, the three-dimensional image transformation 100 can mathematically transform the one or more two-dimensional coordinates uv.x, uv.y of the first two-dimensional image space to the one or more three-dimensional coordinates pos.x, pos.y, and pos.z of the three-dimensional image space 104. In some embodiments, the three-dimensional image transformation 100 can simultaneously transform multiple two-dimensional coordinates uv.x, uv.y of the first two-dimensional image space to their corresponding three-dimensional coordinates pos.x, pos.y, and pos.z of the three-dimensional image space 104 in parallel. In the exemplary embodiment illustrated in FIG. 1, the three-dimensional image transformation 100 projects the one or more three-dimensional coordinates pos.x, pos.y, and pos.z of the three-dimensional image space 104 onto the one or more two-dimensional coordinates uv.x and uv.y of the first two-dimensional image space to map the one or more two-dimensional coordinates uv.x and uv.y of the first two-dimensional image space to the one or more three-dimensional coordinates pos.x, pos.y, and pos.z of the three-dimensional image space 104. In some embodiments, the three-dimensional image transformation 100 projects the one or more three-dimensional coordinates pos.x, pos.y, and pos.z of the three-dimensional image space 104 onto the one or more two-dimensional coordinates uv.x and uv.y of the first two-dimensional image space using one or more mathematical forward projection functions. Examples of these forward projection functions are to be described in further detail below.

As illustrated in FIG. 1, the three-dimensional image transformation 100 can mathematically transform the one or more three-dimensional coordinates pos.x, pos.y, and pos.z of the three-dimensional image space 104 onto the one or more two-dimensional coordinates UV.x and UV.y of the second two-dimensional image space. In some embodiments, the three-dimensional image transformation 100 can simultaneously transform multiple three-dimensional coordinates pos.x, pos.y, and pos.z of the three-dimensional image space 104 to their corresponding two-dimensional coordinates UV.x and UV.y of the second two-dimensional image space in parallel. In the exemplary embodiment illustrated in FIG. 1, the three-dimensional image transformation 100 projects the one or more two-dimensional coordinates UV.x and UV.y of the second two-dimensional image space onto the one or more three-dimensional coordinates pos.x, pos.y, and pos.z of the three-dimensional image space 104 to map the one or more three-dimensional coordinates pos.x, pos.y, and pos.z of the three-dimensional image space 104 onto the one or more two-dimensional coordinates UV.x and UV.y of the second two-dimensional image space. In some embodiments, the three-dimensional image transformation 100 projects the one or more two-dimensional coordinates UV.x and UV.y of the second two-dimensional image space onto the one or more three-dimensional coordinates pos.x, pos.y, and pos.z of the three-dimensional image space 104 using one or more mathematical reverse projection functions. Examples of these reverse projection functions are to be described in further detail below.

As illustrated in FIG. 1, the three-dimensional image space 104 can be characterized as being as a universal image mapping space to transform the one or more two-dimensional coordinates uv.x and uv.y of the first two-dimensional image space onto the two-dimensional coordinates UV.x and UV.y of the second two-dimensional image space. This universal image mapping space advantageously reduces the overhead associated with transforming the one or more two-dimensional coordinates uv.x and uv.y of the first two-dimensional image space onto the two-dimensional coordinates UV.x and UV.y of the second two-dimensional image space. As described above, the conventional two-dimensional image projection directly transforms the different graphical elements, such as images and/or videos to provide some examples, between two-dimensional coordinates of a first two-dimensional image space and two-dimensional coordinates of a second two-dimensional image space. This direct conventional two-dimensional image projection requires numerous mathematical forward projection functions to transform each of the two-dimensional image spaces into other two-dimensional image spaces and numerous mathematical reverse projection functions to transform the other two-dimensional image spaces back to each of the two-dimensional image spaces.

In some embodiments, the event, as described above, often combines many different graphical elements, such as images and/or videos to provide some examples, to enhance the immersion of the audience as they are viewing the event. These different graphical elements are typically in many different two-dimensional image spaces, such as, five (5) different two-dimensional image spaces. The direct conventional two-dimensional image projection often needs at least twenty (20) different mathematical forward projection functions and at least twenty (20) different mathematical reverse projection functions to transform the different graphical elements among these five (5) different two-dimensional image spaces. However, the three-dimensional image transformation 100 only needs four (4) different mathematical forward projection functions and four (4) different mathematical reverse projection functions to transform the different graphical elements among these four (4) different two-dimensional image spaces. The four (4) mathematical forward projection functions transform the different graphical elements from their corresponding two-dimensional image spaces to the three-dimensional image space 104 and the four (4) mathematical reverse projection functions to transform the three-dimensional image space 104 to their corresponding two-dimensional image spaces.

Often times, it can be desirable to combine new graphical elements in new two-dimensional image spaces with the different graphical elements in existing two-dimensional image spaces. For example, the direct conventional two-dimensional image projection often needs five (5) new mathematical forward projection functions and five (5) new mathematical reverse projection functions to transform a new graphical element in a sixth two-dimensional image space among the five (5) different two-dimensional image spaces as described in the example above. However, the three-dimensional image transformation 100 only needs one (1) new mathematical forward projection function and one (1) new mathematical reverse projection function to transform the new graphical element in the sixth two-dimensional image space among the five (5) different two-dimensional image spaces. The one (1) new mathematical forward projection function transforms the new graphical element from the sixth two-dimensional image space to the three-dimensional image space 104 and the one (1) new mathematical reverse projection function to transform the three-dimensional image space 104 to the sixth two-dimensional image space.

Moreover, the one or more computer systems, which execute the three-dimensional image transformation 100, often perform mathematical calculations, such as floating point operations to provide an example, in a parallel manner. In some embodiments, as described above, the three-dimensional image transformation 100 can simultaneously transform multiple two-dimensional coordinates uv.x and uv.y of the first two-dimensional image space onto multiple two-dimensional coordinates UV.x and UV.y the second two-dimensional image space in the parallel manner using multiple three-dimensional coordinates pos.x, pos.y, and pos.z of the three-dimensional image space 104. In these embodiments, the three-dimensional image transformation 100 can simultaneously transform the two-dimensional coordinates uv.x and uv.y of the first two-dimensional image space on a per image space basis, namely, transform all of the two-dimensional coordinates uv.x and uv.y onto the multiple two-dimensional coordinates UV.x and UV.y the second two-dimensional image space in the parallel manner using multiple three-dimensional coordinates pos.x, pos.y, and pos.z of the three-dimensional image space 104. As a result, the processing time needed to perform these transformations can be characterized as being effectively independent of the size of the first two-dimensional image space, the second two-dimensional image space, and/or the three-dimensional image space 104.

In contrast, the direct conventional two-dimensional image projection, as described above, directly transforms the different graphical elements, such as images and/or videos to provide some examples, between the two-dimensional coordinates of the first two-dimensional image space and the two-dimensional coordinates of the second two-dimensional image space on a per pixel basis, namely, pixel by pixel. As a result, the processing time needed to perform the direct conventional two-dimensional image projection is dependent upon the size of the first two-dimensional image space and/or the second two-dimensional image space. The direct conventional two-dimensional image projection needs more processing time to directly transform larger first two-dimensional image spaces and/or larger second two-dimensional image spaces when compared to smaller first two-dimensional image spaces and/or smaller second two-dimensional image spaces. However, the processing time needed by the three-dimensional image transformation 100 to transform larger first two-dimensional image spaces, larger second two-dimensional image spaces, and/or larger three-dimensional image spaces 104 is equivalent to the processing time needed by the three-dimensional image transformation 100 to transform smaller first two-dimensional image spaces, smaller second two-dimensional image spaces, and/or smaller three-dimensional image spaces 104 as a result of the parallel manner of the transformation performed by the three-dimensional image transformation 100. This results in a significantly smaller memory footprint and/or a significant increase in processing speed when compared to the direct conventional two-dimensional image projection. In some embodiments, this processing speed can further be increased by executing the three-dimensional image transformation 100 on a specialized graphics processor, such as a graphics processing unit (GPU) to provide an example. In these embodiments, the specialized graphics processor can be implemented using a parallel structure that causes the specialized graphics processor to be more efficient than a general purpose central processing unit (CPU) in transforming the multiple two-dimensional coordinates uv.x and uv.y of the first two-dimensional image space onto the multiple two-dimensional coordinates UV.x and UV.y the second two-dimensional image space using the multiple three-dimensional coordinates pos.x, pos.y, and pos.z of the three-dimensional image space 104.

Exemplary Mathematical Forward Projection Functions

As described above, the three-dimensional image transformation 100 projects the three-dimensional coordinates pos.x, pos.y, and pos.z of the three-dimensional image space 104 onto the two-dimensional coordinates uv.x and uv.y of the first two-dimensional image space using one or more mathematical forward projection functions. The discussion to follow is to describe various mathematical forward projection functions for mathematically projecting the three-dimensional coordinates pos.x, pos.y, and pos.z of the three-dimensional image space 104 onto the two-dimensional coordinates uv.x and uv.y of the first two-dimensional image space.

The three-dimensional image transformation 100 can mathematically project the three-dimensional coordinates pos.x, pos.y, and pos.z of the three-dimensional image space 104 onto the two-dimensional coordinates uv.x and uv.y of the first two-dimensional image space using an equirectangular projection function as follows:

$$\text{radius} = \sqrt{pos.x^2 + pos.z^2} \quad (1)$$
$$\alpha = -a\tan2(-pos.x, pos.z)$$
$$\beta = a\tan2(pos.y, \text{radius})$$
$$uv.x = \frac{\alpha - \pi}{-2\pi} \text{ and } uv.y = \frac{\beta - \frac{\pi}{2}}{\pi}$$

The three-dimensional image transformation 100 can mathematically project the three-dimensional coordinates pos.x, pos.y, and pos.z of the three-dimensional image space 104 onto the two-dimensional coordinates uv.x and uv.y of the first two-dimensional image space using an equidistant fisheye projection function as follows:

$$\text{max Angle} = 180° \quad (2)$$
$$\text{radius} = \sqrt{pos.x^2 + pos.y^2}$$
$$\theta = a\tan2(\text{radius}, pos.z)$$
$$\varphi = a\tan2(pos.y, pos.x)$$
$$d = (\theta / \text{maxAngle})$$
$$uv.x = d * \cos(\varphi) \text{ and } uv.y = d * \sin(\varphi)$$

The three-dimensional image transformation 100 can mathematically project the three-dimensional coordinates pos.x, pos.y, and pos.z of the three-dimensional image space 104 onto the two-dimensional coordinates uv.x and uv.y of the first two-dimensional image space using an equisolid fisheye projection function as follows:

$$\text{max Angle}_1 = 180° \quad (3)$$
$$\text{radius} = \sqrt{pos.x^2 + pos.y^2}$$
$$\theta_1 = a\tan2(\text{radius}, pos.z)$$
$$\varphi = a\tan2(pos.y, pos.x)$$
$$\theta_2 = 2 * \sin\left(\frac{\theta_1}{2}\right)$$
$$\text{max Angle}_2 = 2 * \sin\left(\frac{\text{maxAngle}_1}{2}\right)$$
$$d = (\theta_2 / \text{maxAngle}_2)$$
$$uv.x = d * \cos(\varphi) \text{ and } uv.y = d * \sin(\varphi)$$

The three-dimensional image transformation 100 can mathematically project the three-dimensional coordinates pos.x, pos.y, and pos.z of the three-dimensional image space 104 onto the two-dimensional coordinates uv.x and uv.y of the first two-dimensional image space using a stereographic fisheye projection function as follows:

$$\text{max Angle}_1 = 180° \quad (4)$$
$$\text{radius} = \sqrt{pos.x^2 + pos.y^2}$$
$$\theta_1 = a\tan2(\text{radius}, pos.z)$$
$$\varphi = a\tan2(pos.y, pos.x)$$
$$\theta_2 = 2 * \sin\left(\frac{\theta_1}{2}\right)$$
$$\text{max Angle}_2 = 2 * \tan\left(\frac{\text{maxAngle}_1}{2}\right)$$
$$d = (\theta_2 / \text{maxAngle}_2)$$
$$uv.x = d * \cos(\varphi) \text{ and } uv.y = d * \sin(\varphi)$$

The three-dimensional image transformation 100 can mathematically project the three-dimensional coordinates pos.x, pos.y, and pos.z of the three-dimensional image space 104 onto the two-dimensional coordinates uv.x and uv.y of the first two-dimensional image space using an orthographic fisheye projection as follows:

$$\text{max Angle}_1 = 180° \quad (5)$$
$$\text{radius} = \sqrt{pos.x^2 + pos.y^2}$$
$$\theta_1 = a\tan2(\text{radius}, pos.z)$$
$$\varphi = a\tan2(pos.y, pos.x)$$
$$\theta_2 = \sin(\theta_1)$$
$$\text{max Angle}_2 = \sin(\text{maxAngle}_1)$$
$$d = (\theta_2 / \text{maxAngle}_2)$$
$$uv.x = d * \cos(\varphi) \text{ and } uv.y = d * \sin(\varphi)$$

The three-dimensional image transformation 100 can mathematically project the three-dimensional coordinates pos.x, pos.y, and pos.z of the three-dimensional image space 104 onto two-dimensional coordinates qu and qv of the first two-dimensional image space using an equiangular cube-map projection function. In some embodiments, the two-dimensional coordinates qu and qv of the first two-dimensional image are similar to the two-dimensional coordinates uv.x and uv.y of the first two-dimensional image space as described above with the two-dimensional coordinates qu and qv of the first two-dimensional image additionally being associated with a cube face index (I) as to be described in further detail below. In some embodiments, the cube face index (I) corresponds to a cube texture map, or face, of the cube. This equiangular cubemap projection function can be characterized as follows:

(a) Project the three-dimensional coordinates pos.x, pos.y, and pos.z of the three-dimensional image space 104 onto a cube texture map. In some embodiments, the cube texture map can index various texture maps, for example, six (6) texture maps corresponding to the six (6) faces of a cube. In these embodiments, this projection returns the cube face index (I) corresponding to one of the cube texture maps, or faces, of the cube and two-dimensional coordinates $p_x$ and $p_y$ of the cube face index. The projection discussed in (a) above is well known and will not be described in further detail.

(b) Project the two-dimensional coordinates $p_x$ and $p_y$ of the cube face index onto the two-dimensional coordinates qu and qv of the first two-dimensional image space as follows:

$$qu = \frac{2}{\pi} * atan(2 * p_x) + \frac{1}{2} \quad (6)$$

$$qv = \frac{2}{\pi} * atan(2 * p_y) + \frac{1}{2}.$$

Exemplary Mathematical Reverse Projection Functions

As described above, the three-dimensional image transformation 100 projects the two-dimensional coordinates UV.x and UV.y of the second two-dimensional image space onto the three-dimensional coordinates pos.x, pos.y, and pos.z of the three-dimensional image space 104 using one or more mathematical reverse projection functions. The discussion to follow is to describe various mathematical reverse projection functions for mathematically projecting the two-dimensional coordinates UV.x and UV.y of the second two-dimensional image space onto the three-dimensional coordinates of the image from the three-dimensional coordinates pos.x, pos.y, and pos.z of the three-dimensional image space 104.

The three-dimensional image transformation 100 can mathematically project the two-dimensional coordinates UV.x and UV.y of the second two-dimensional image space onto the three-dimensional coordinates pos.x, pos.y, and pos.z of the three-dimensional image space 104, for example, a three-dimensional spherical image space, using an equirectangular projection function as follows:

$$longitude = uv.x * (-2\pi) - \frac{\pi}{2} \quad (7)$$

$$latitude = uv.y * \pi - \frac{\pi}{2}$$

$$pos.x = \cos(latitude) * \cos(longitude), \ pos.y = \sin(latitude),$$

$$\text{and } pos.z = \cos(latitude) * \sin(longitude)$$

The three-dimensional image transformation 100 can mathematically project the two-dimensional coordinates UV.x and UV.y of the second two-dimensional image space onto the three-dimensional coordinates pos.x, pos.y, and pos.z of the three-dimensional image space 104, for example, a three-dimensional hemispherical image space, using a fisheye projection function as follows:

$$uv = uv * 2 - 1 \quad (8)$$

$$halfAperture = \frac{180}{2}$$

$$r = magnitude(uv)$$

$$\phi = atan2(uv.y, uv.x)$$

$$\theta = r * halfAperture * DegreesToRadians$$

$$pos.x = \sin(\theta) * \cos(\phi), \ pos.y = \sin(\theta) * \sin(\phi),$$

$$\text{and } pos.z = \cos(\theta)$$

It should be noted that the exemplary embodiments for the mathematical forward projection functions and/or the mathematical reverse projection functions as described above are not limiting. Those skilled in the relevant art(s) will recognize that other mathematical forward projection functions and/or the mathematical reverse projection functions are possible without departing from the spirit and scope of the present disclosure.

Figure 2:
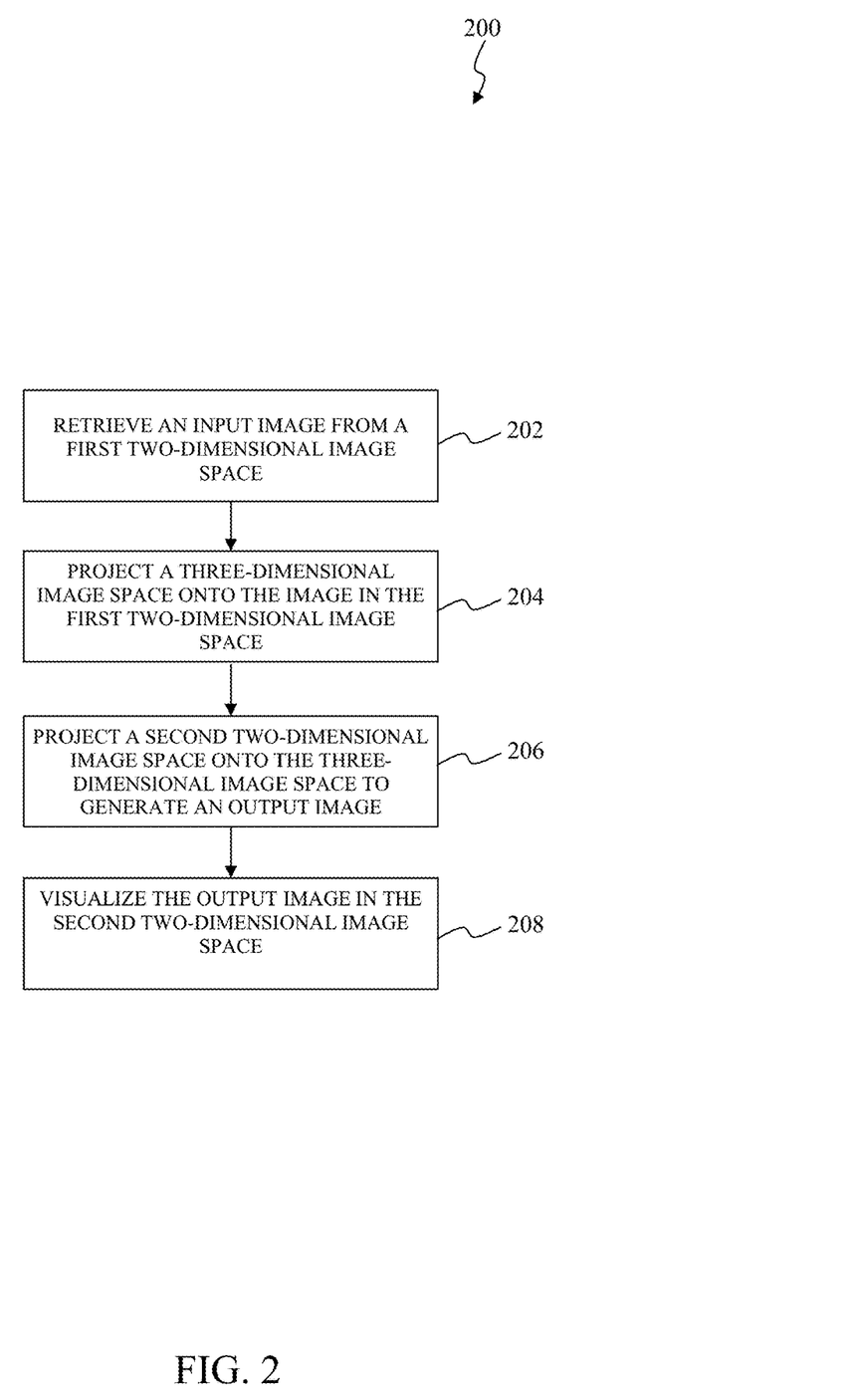
FIG. 2 illustrates a flowchart for the exemplary three-dimensional image transformation in accordance with some exemplary embodiments of the present disclosure.

FIG. 2 illustrates a flowchart for the exemplary three-dimensional image transformation in accordance with some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 200 for transforming an image from a first two-dimensional image space into a second two-dimensional image space using a three-dimensional image space. The operational control flow 200 can represent an exemplary embodiment of the three-dimensional image transformation 100 as described above in FIG. 1 that can be executed by one or more computer systems.

At operation 202, the operational control flow 200 retrieves an input image from a first two-dimensional image space, such as one of the two-dimensional image spaces 102.1 through 102.n as described above in FIG. 1 to provide an example. In some embodiments, the first two-dimensional image space can include a two-dimensional equirectangular image space, a two-dimensional fisheye image space, a two-dimensional cubemap image space, and/or any other suitable two-dimensional image space that will be recognized by those skilled in the relevant art(s) without departing from the spirit and scope of the present disclosure. In some embodiments, the input image can be captured by an image capture device, such as a digital camera and/or a video camera to provide some examples, which is thereafter rendered to be in the first two-dimensional image space. In these embodiments, the input image can be from a series of images, also referred to as video, that is captured by the image capture device. In these embodiments, the input image can be in a wide field of view image, such as a panoramic image to provide an example, that includes horizontally elongated fields of view. These horizontally elongated fields of view can approximate, or be greater than, that of the human eye, for example, approximately 160 degrees by approximately 160 degrees. This can result an aspect ratio of 2:1 or larger with the panoramic image being at least twice as wide as it is high. Some panoramic images have aspect ratios of 4:1 and sometimes 10:1, covering fields of view of up to approximately 360 degrees.

In the exemplary embodiment illustrated in FIG. 2, the input image can include picture elements, also referred to as pixels. In these embodiments, the pixels can include one or more intensity values, or brightness values. For example, the pixels can include a single intensity value for a black and white image and/or multiple intensity values for different colors, such as red, green, and blue to provide an example, for a color image. In the exemplary embodiment illustrated in FIG. 2, the pixels can be arranged into a two-dimensional image space having two-dimensional coordinates, such as the two-dimensional coordinates uv.x and uv.y as described above in FIG. 1, in the first two-dimensional image space.

At operation 204, the operational control flow 200 projects three-dimensional coordinates, such as the three-dimensional coordinates as described above in FIG. 1, of a three-dimensional image space onto the two-dimensional coordinates of the input image in the first two-dimensional image space from operation 202. In some embodiments, the three-dimensional image space can include a three-dimensional cubic image space, a three-dimensional rectangular prism image space, a three-dimensional spherical image space, a three-dimensional conical image space, a three-dimensional cylindrical image space, and/or any suitable three-dimensional image space that will be recognized by those skilled in the relevant art(s) without departing from the spirit and scope of the present disclosure. In these embodiments, the three-dimensional image space can include a portion of any of these three-dimensional image spaces, such as a hemispherical structure, also referred to as a dome, that will be recognized by those skilled in the relevant art(s) without departing from the spirit and scope of the present disclosure.

In some embodiments, the operational control flow 200 projects the three-dimensional coordinates of the three-dimensional image space onto the two-dimensional coordinates of the input image in the first two-dimensional image space from operation 202 to map the two-dimensional coordinates of the input image onto the three-dimensional coordinates of the three-dimensional image space. In some embodiments, the operational control flow 200 projects the three-dimensional coordinates of the three-dimensional image space onto the two-dimensional coordinates of the input image the three-dimensional coordinates of the three-dimensional image space onto the two-dimensional coordinates of the input image in the first two-dimensional image space using the one or more mathematical forward projection functions as described above.

At operation 206, the operational control flow 200 projects two-dimensional coordinates of a second two-dimensional image space, such as one of the two-dimensional image spaces 102.1 through 102.n as described above in FIG. 1 to provide an example, onto the three-dimensional coordinates of the three-dimensional image space from operation 204 to map the three-dimensional coordinates of the three-dimensional image space from operation 204 to the two-dimensional coordinates of the second two-dimensional image space to generate an output image. In some embodiments, the second two-dimensional image space can include a two-dimensional equirectangular image space, a two-dimensional fisheye image space, a two-dimensional cubemap image space, and/or any other suitable two-dimensional image space that will be recognized by those skilled in the relevant art(s) without departing from the spirit and scope of the present disclosure. In the exemplary embodiment illustrated in FIG. 2, the output image can include picture elements, also referred to as pixels. In these embodiments, the pixels can include one or more intensity values, or brightness values. For example, the pixels can include a single intensity value for a black and white image and/or multiple intensity values for different colors, such as red, green, and blue to provide an example, for a color image. In the exemplary embodiment illustrated in FIG. 2, the pixels can be arranged into a two-dimensional image space having two-dimensional coordinates, such as the two-dimensional coordinates UV.x and UV.y as described above in FIG. 1, in the second two-dimensional image space. In some embodiments, the operational control flow 200 projects the two-dimensional coordinates of the second two-dimensional image space from operation 206 onto the three-dimensional coordinates of the three-dimensional image space from operation 204 using the one or more mathematical reverse projection functions as described above.

At operation 208, the operational control flow 200 can visualize, for example, color and/or texturize, the output image in the second two-dimensional image space from operation 206 in accordance with the one or more intensity values, or brightness values, of the input image in the first two-dimensional image space from operation 202. In some embodiments, the operational control flow 200 can mathematically project the one or more intensity values, or brightness values, of the pixels of the input image in the first two-dimensional image space from operation 202 onto corresponding pixels of the output image in the second two-dimensional image space from operation 206. In these embodiments, each of the two-dimensional coordinates of the input image in the first two-dimensional image space from operation 202 corresponds to one of the two-dimensional coordinates of the output image from operation 206. In these embodiments, the three-dimensional image transformation 100 can map the one or more intensity values, or brightness values, for the pixels from their two-dimensional coordinates in the first two-dimensional image space from operation 202 onto their corresponding two-dimensional coordinates in the second two-dimensional image space from operation 206.

Figure 3:
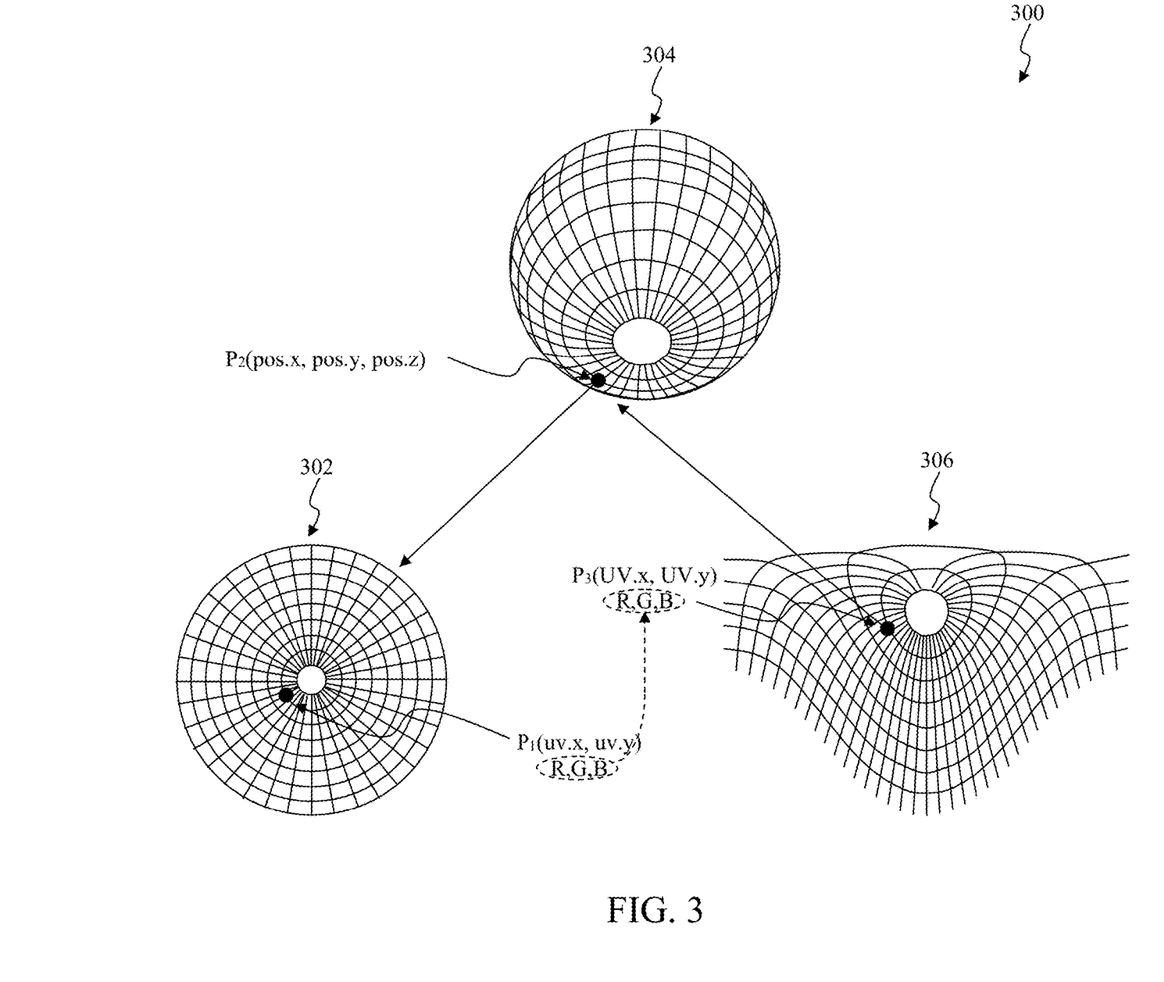
FIG. 3 graphically illustrates an exemplary embodiment of the exemplary three-dimensional image transformation in accordance with some exemplary embodiments of the present disclosure.

FIG. 3 graphically illustrates an exemplary embodiment of the exemplary three-dimensional image transformation in accordance with some exemplary embodiments of the present disclosure. In the exemplary embodiment illustrated in FIG. 3, a three-dimensional image transformation 300 can mathematically transform an input image from a two-dimensional fisheye image space 302 to generate an output image in a two-dimensional latitude/longitude image space 306 using a spherical three-dimensional image space 304. As illustrated in FIG. 3, the three-dimensional image transformation 300, when executed by the one or more computer systems, can mathematically transform the input image between the two-dimensional fisheye image space 302 and the spherical three-dimensional image space 304 and can thereafter mathematically transform the image between the spherical three-dimensional image space 304 and the two-dimensional latitude/longitude image space 306 to generate the output image in the two-dimensional latitude/longitude image space 306. The three-dimensional image transformation 300 can represent an exemplary embodiment of the three-dimensional image transformation 100 as described above in FIG. 1.

As illustrated in FIG. 3, the three-dimensional image transformation 300 can mathematically project the input image from the two-dimensional fisheye image space 302 onto the spherical three-dimensional image space 304. In the exemplary embodiment illustrated in FIG. 3, the three-dimensional image transformation 300 projects the spherical three-dimensional image space 304 onto the input image from the two-dimensional fisheye image space 302 to map the two-dimensional coordinates uv.x and uv.y of the pixels $P_1$ of the input image from the two-dimensional fisheye image space 302 onto the three-dimensional coordinates pos.x, pos.y, and pos.z of the pixels $P_2$ of the spherical three-dimensional image space 304. As illustrated in FIG. 3, the three-dimensional image transformation 300 projects a spherical three-dimensional image space 304 onto the input image in a two-dimensional fisheye image space 302 using Equation (2) as described above.

As illustrated in FIG. 3, the three-dimensional image transformation 300 can mathematically project the spherical three-dimensional image space 304 onto the two-dimensional latitude/longitude image space 306 to generate the output image. In the exemplary embodiment illustrated in FIG. 3, the three-dimensional image transformation 300 projects the two-dimensional coordinates UV.x and UV.y onto the spherical three-dimensional image space 304 to map the three-dimensional coordinates pos.x, pos.y, and pos.z of the pixels $P_2$ of the spherical three-dimensional image space 304 onto the two-dimensional coordinates UV.x and UV.y of the pixels $P_3$ of the two-dimensional latitude/longitude image space 306 to generate the output image. As illustrated in FIG. 3, the three-dimensional image transformation 300 can mathematically project the spherical three-dimensional image space 304 onto the two-dimensional latitude/longitude image space 306 using Equation (1) as described above.

In the exemplary embodiment illustrated in FIG. 3, the three-dimensional image transformation 300 can visualize, for example, color and/or texturize, the output image in the two-dimensional latitude/longitude image space 306 in accordance with the one or more intensity values, or brightness values, of the input image in the two-dimensional fisheye image space 302. As illustrated in FIG. 3, the three-dimensional image transformation 300 can map the one or more intensity values, or brightness values, R, G, B of the two-dimensional coordinates uv.x and uv.y of the pixels $P_1$ of the input image in the two-dimensional fisheye image space 302 onto two-dimensional coordinates UV.x and UV.y of the pixels $P_3$ of the output image in the two-dimensional latitude/longitude image space 306.

Figure 4:
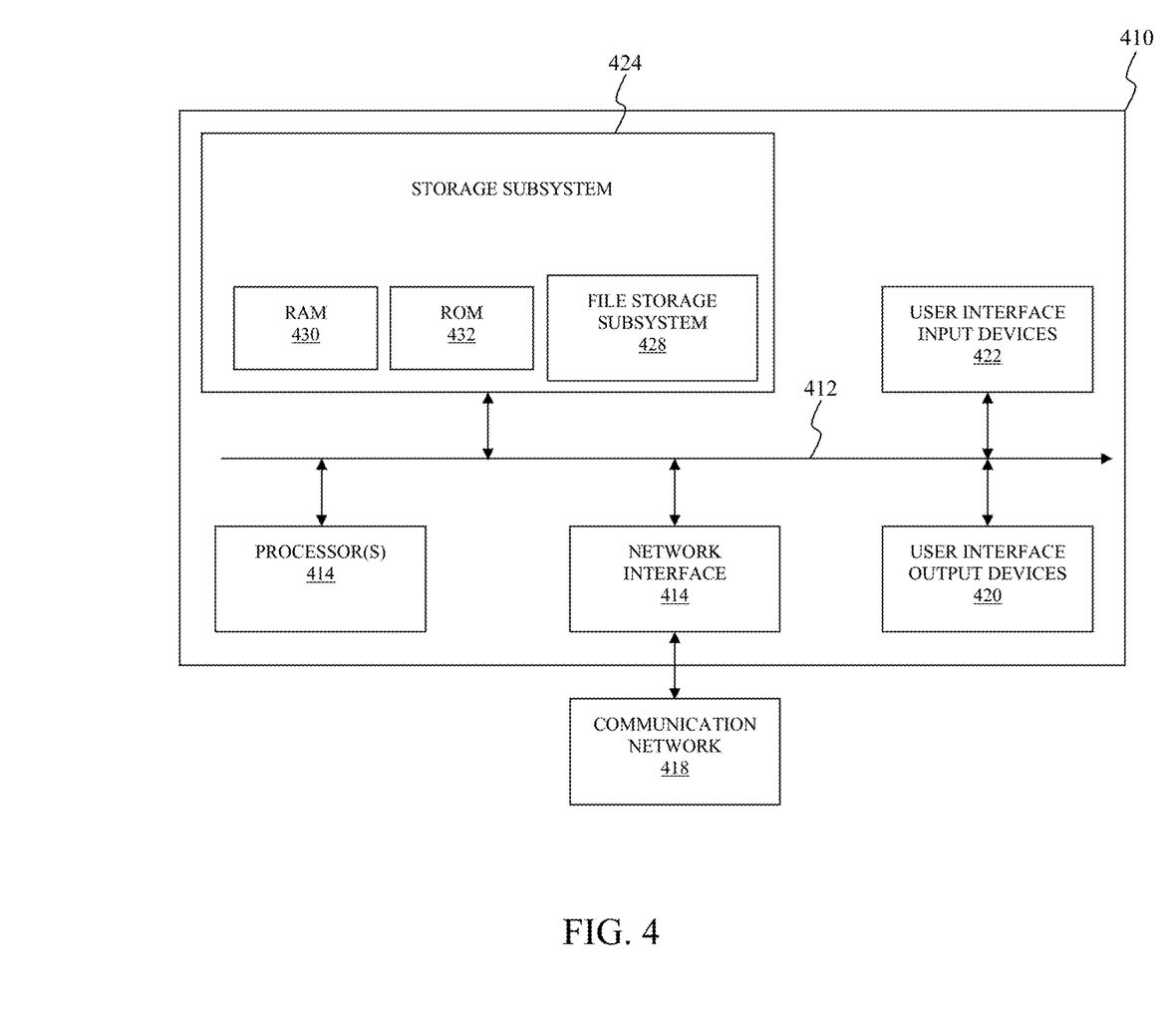
FIG. 4 graphically illustrates a simplified block diagram of a computer system that can be utilized to execute the exemplary three-dimensional image transformation in accordance with some exemplary embodiments of the present disclosure.

Exemplary Computer System that can be Utilized to Execute the Exemplary Three-Dimensional Image Transformation FIG. 4 graphically illustrates a simplified block diagram of a computer system that can be utilized to execute the exemplary three-dimensional image transformation in accordance with some exemplary embodiments of the present disclosure. The discussion of FIG. 4 to follow describes an exemplary computer system 410 that can be used to execute the three-dimensional image transformation 100 as described above in FIG. 1 and/or the operational control flow 200 as described above in FIG. 2.

In the exemplary embodiment illustrated in FIG. 4, the computer system 410 typically includes at least one processor 414 which communicates with a number of peripheral devices via bus subsystem 412. Typically, the at least processor 414 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).)

The computer system typically includes an operating system, such as Microsoft's Windows, Sun Microsystems's Solaris, Apple Computer's MacOs, Linux or UNIX. The computer system also typically can include a Basic Input/Output System (BIOS) and processor firmware. The operating system, BIOS and firmware are used by the processor to control subsystems and interfaces coupled to the processor. Typical processors compatible with these operating systems include the Pentium and Itanium from Intel, the Opteron and Athlon from Advanced Micro Devices, and the ARM processor from ARM Holdings.

As illustrated in FIG. 4, these peripheral devices may include a storage subsystem 424, comprising a memory subsystem 426 and a file storage subsystem 428, user interface input devices 422, user interface output devices 420, and a network interface subsystem 416. The input and output devices allow user interaction with computer system 410. In the exemplary embodiment illustrated in FIG. 4, the network interface subsystem 416 provides an interface to outside networks, including an interface to a computer network 418, and is coupled via a computer network 418 to corresponding interface devices in other computer systems or machines. The computer network 418 may comprise many interconnected computer systems, machines and communication links. These communication links may be wired links, optical links, wireless links, or any other devices for communication of information. The computer network 418 can be any suitable computer network, for example a wide area network such as the Internet, and/or a local area network such as Ethernet. The computer network 418 can be wired and/or wireless, and the computer network can use encryption and decryption methods, such as is available with a virtual private network. The computer network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

The user interface input devices 422 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into the computer system 410 or onto the computer network 418. The user interface input devices 422 typically allow a user to select objects, icons, text and the like that appear on some types of user interface output devices, for example, a display subsystem.

The user interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from the computer system 410 to the user or to another machine or computer system.

The memory subsystem 426 typically includes a number of memories including a main random-access memory ("RAM") 440 (or other volatile storage device) for storage of instructions and data during program execution and a read only memory ("ROM") 442 in which fixed instructions are stored. The file storage subsystem 428 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 428.

The bus subsystem 412 provides a device for letting the various components and subsystems of the computer system 410 communicate with each other as intended. Although the bus subsystem 412 is shown schematically as a single bus, alternative embodiments of the bus subsystem may use multiple busses. For example, RAM-based main memory can communicate directly with file storage systems using Direct Memory Access ("DMA") systems.

Exemplary Use Cases of the Exemplary Three-Dimensional Image Transformation

The Detailed Description to follow is to describe one or more exemplary use cases for the three-dimensional image transformations described herein. Those skilled in the relevant art(s) will recognize that these exemplary use cases are for exemplary purposes only and not limiting. Those skilled in the relevant art(s) will recognize that other uses cases are possible for the three-dimensional image transformations described herein without departing from the spirt and scope of the present disclosure.

Figure 5:
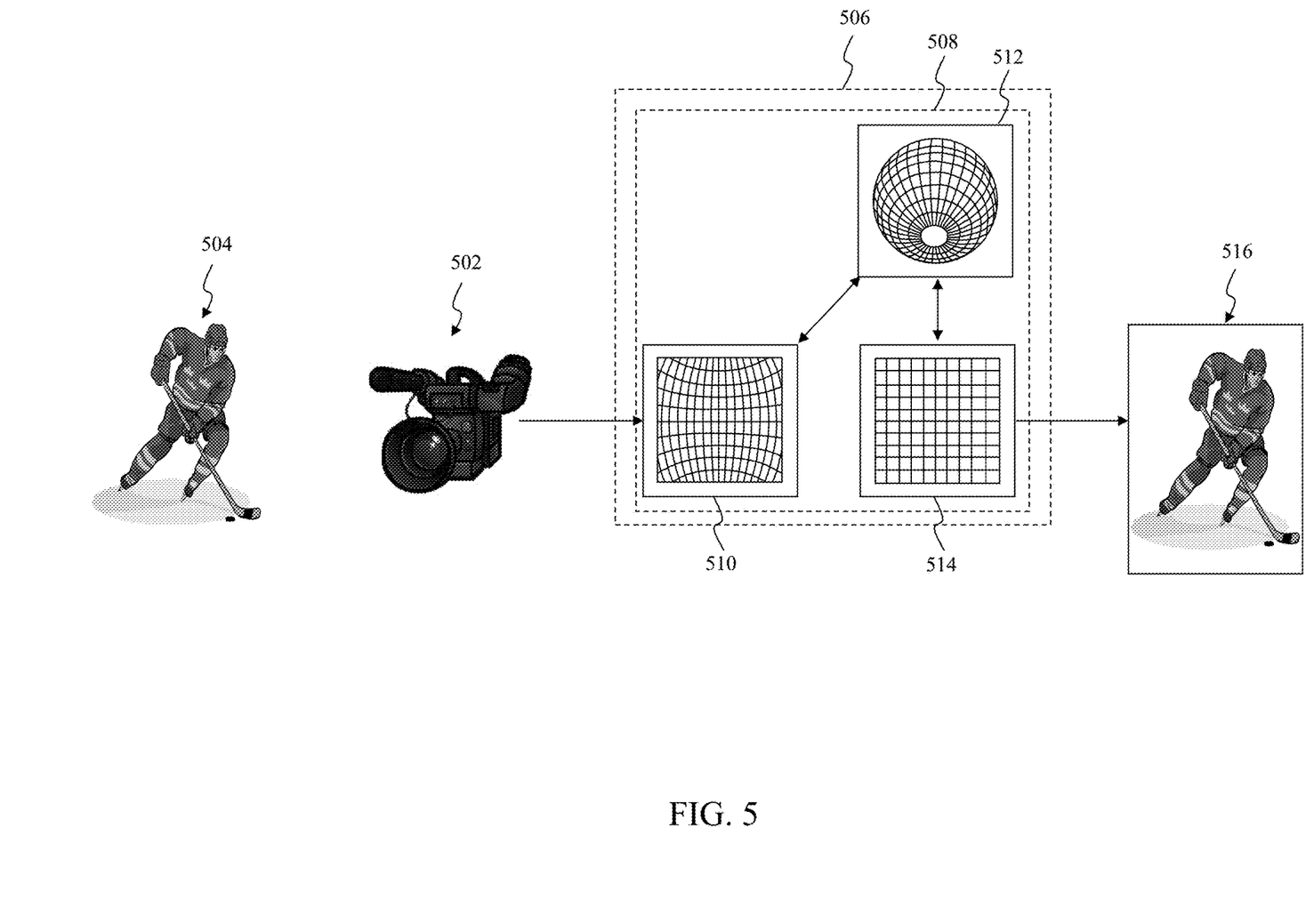
FIG. 5 graphically illustrates an exemplary three-dimensional image transformation of an image captured by an image capture device in accordance with some exemplary embodiments of the present disclosure.

FIG. 5 graphically illustrates an exemplary three-dimensional image transformation of an image captured by an image capture device in accordance with some exemplary embodiments of the present disclosure. In an exemplary embodiment illustrated in FIG. 5, an image capture device 502, such as a digital camera and/or a video camera to provide some examples, can capture a scene 504. The image capture device 502 can be implemented as a standalone, or a discrete electrical, mechanical, and/or electro-mechanical device, and/or can be incorporated within or coupled to another electrical, mechanical, and/or electro-mechanical device, or host device, such as a wireless communication device, a smart phone, a laptop computing device, a desktop computing device, a tablet computing device, a personal assistant device, a monitor, a television, a wearable device, and/or any other suitable electronic device that will be apparent to those skilled in the relevant art(s) without departing the spirit and scope of the present disclosure. In some embodiments, the scene 504 can be representative of a musical event, a theatrical event, a sporting event, a motion picture, and/or any other suitable event that will be apparent to those skilled in the relevant art(s) without departing the spirit and scope of the present disclosure. In some embodiments, the image capture device 502 can capture the scene 504 within a venue. In these embodiments, the venue can represent a music venue, for example, a music theater, a music club, and/or a concert hall, a sporting venue, for example, an arena, a convention center, and/or a stadium, and/or any other suitable venue that will be apparent to those skilled in the relevant art(s) without departing the spirit and scope of the present disclosure. In some embodiments, the image capture device 502 can capture the scene 504 in an out of doors setting, for example, in natural settings. In these embodiments, the out of doors setting can include a natural park, a park, an outdoor venue, and/or any other out of doors setting that will be apparent to those skilled in the relevant art(s) without departing the spirit and scope of the present disclosure.

As illustrated in FIG. 5, the scene 504 captured by the image capture device 502 can be rendered to provide an input image for one or more computing systems 506 executing a three-dimensional image transformation 508. In the exemplary embodiment illustrated in FIG. 5, the scene 504 captured by the image capture device 502 can be rendered to provide the input image in a two-dimensional equidistant fisheye image space 510 of the three-dimensional image transformation 508.

As illustrated in FIG. 5, the three-dimensional image transformation 508 can mathematically transform two-dimensional coordinates of two-dimensional equidistant fisheye image space 510 to three-dimensional coordinates of a three-dimensional spherical image space 508. In the exemplary embodiment illustrated in FIG. 5, the three-dimensional image transformation 508 projects the three-dimensional coordinates of the three-dimensional spherical image space 508 onto the two-dimensional coordinates of the two-dimensional equidistant fisheye image space 510 to map the two-dimensional coordinates of the two-dimensional equidistant fisheye image space 510 to the three-dimensional coordinates of the three-dimensional spherical image space 508 in a substantially similar manner as described above in FIG. 1 through FIG. 4.

In the exemplary embodiment illustrated in FIG. 5, the three-dimensional image transformation 508 can generate an output image in a two-dimensional equidistant image space 514. As illustrated in FIG. 5, the three-dimensional image transformation 508 can mathematically transform the three-dimensional coordinates of the three-dimensional spherical image space 508 to the two-dimensional coordinates of the two-dimensional equidistant image space 514 to generate the output image. In the exemplary embodiment illustrated in FIG. 5, the three-dimensional image transformation 508 projects the two-dimensional coordinates of the two-dimensional equidistant image space 514 onto the three-dimensional coordinates of the three-dimensional spherical image space 508 to map the three-dimensional coordinates of the three-dimensional spherical image space 508 to the two-dimensional coordinates of the two-dimensional equidistant image space 514 in a substantially similar manner as described above in FIG. 1 through FIG. 4.

As illustrated in FIG. 5, the three-dimensional image transformation 508 can visualize, for example, color and/or texturize, the output image in the two-dimensional equidistant image space 514 in accordance with the one or more intensity values, or brightness values, of the input image in the two-dimensional equidistant fisheye image space 510. As illustrated in FIG. 3, the three-dimensional image transformation 508 can map the one or more intensity values, or brightness values, of the two-dimensional coordinates of the input image in the two-dimensional equidistant fisheye image space 510 onto two-dimensional coordinates of the output image in the two-dimensional equidistant image space 514 in a substantially similar manner as described above in FIG. 1 through FIG. 4. Thereafter, the three-dimensional image transformation 508 can provide the output image in the two-dimensional equidistant image space 514 as an output image 516.

Figure 6:
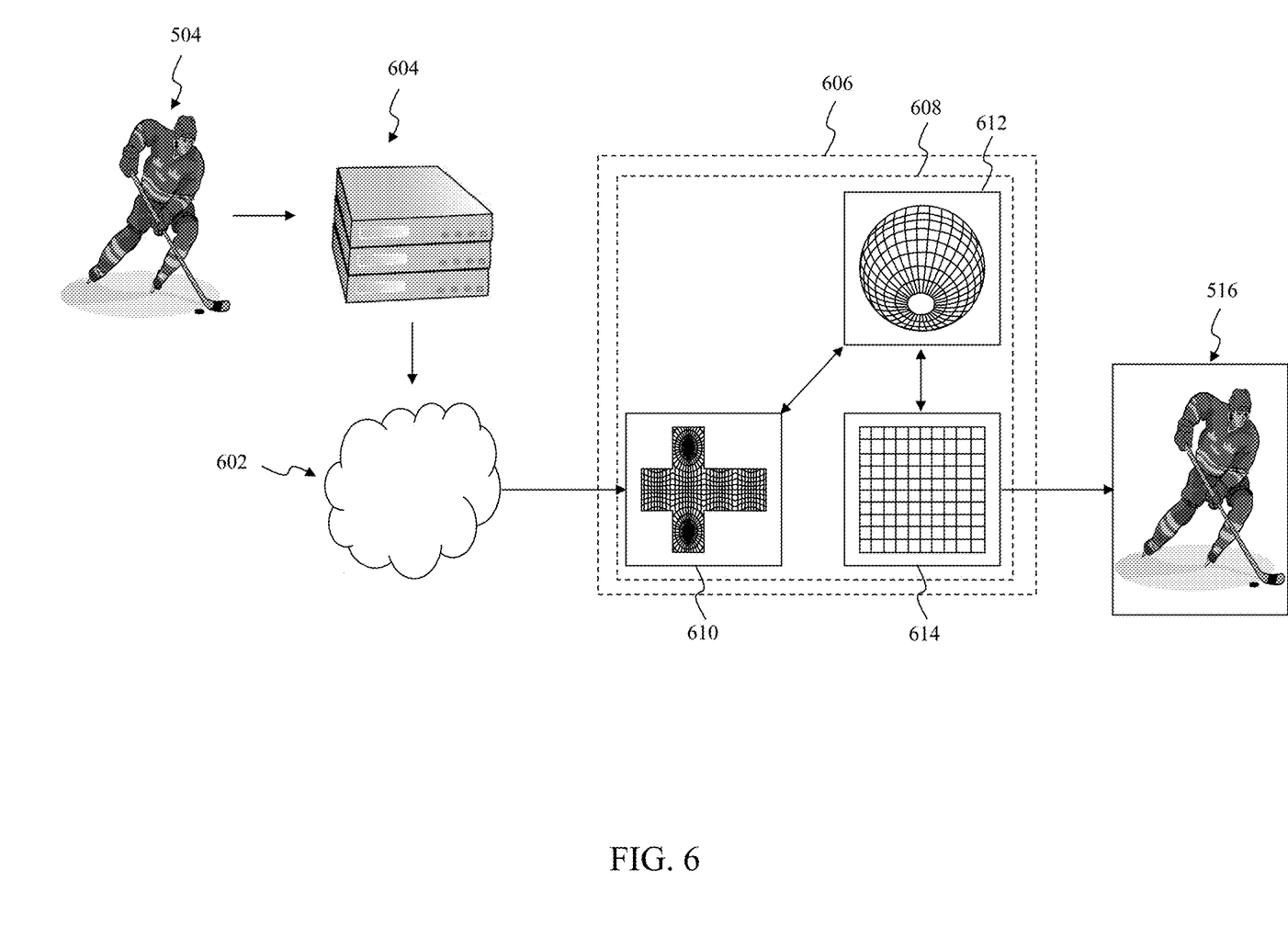
FIG. 6 graphically illustrates an exemplary three-dimensional image transformation of an image received over a computer network in accordance with some exemplary embodiments of the present disclosure.

FIG. 6 graphically illustrates an exemplary three-dimensional image transformation of an image received over a computer network in accordance with some exemplary embodiments of the present disclosure. In an exemplary embodiment illustrated in FIG. 6, an input image for one or more computing systems 606 executing a three-dimensional image transformation 608 can retrieve an input image for the three-dimensional image transformation 608 over a computer network 602, such as the Internet to provide an example. In some embodiments, the scene 504 can be stored on an online video sharing and/or social media platform 604. In these embodiments, the scene 504 can be transferred from the online video sharing and/or social media platform 604, for example, via a webpage, through the computer network 602 to provide the input image in a two-dimensional cubemap image space 610 of the three-dimensional image transformation 608.

As illustrated in FIG. 6, the three-dimensional image transformation 608 can mathematically transform two-dimensional coordinates of two-dimensional cubemap image space 610 to three-dimensional coordinates of a three-dimensional spherical image space 608. In the exemplary embodiment illustrated in FIG. 6, the three-dimensional image transformation 608 projects the three-dimensional coordinates of the three-dimensional spherical image space 608 onto the two-dimensional coordinates of the two-dimensional cubemap image space 610 to map the two-dimensional coordinates of the two-dimensional cubemap image space 610 to the three-dimensional coordinates of the three-dimensional spherical image space 608 in a substantially similar manner as described above in FIG. 1 through FIG. 4.

In the exemplary embodiment illustrated in FIG. 6, the three-dimensional image transformation 608 can generate an output image in a two-dimensional equidistant image space 614. As illustrated in FIG. 6, the three-dimensional image transformation 608 can mathematically transform the three-dimensional coordinates of the three-dimensional spherical image space 608 to the two-dimensional coordinates of the two-dimensional equidistant image space 614 to generate the output image. In the exemplary embodiment illustrated in FIG. 6, the three-dimensional image transformation 608 projects the two-dimensional coordinates of the two-dimensional equidistant image space 614 onto the three-dimensional coordinates of the three-dimensional spherical image space 608 to map the three-dimensional coordinates of the three-dimensional spherical image space 608 to the two-dimensional coordinates of the two-dimensional equidistant image space 614 in a substantially similar manner as described above in FIG. 1 through FIG. 4.

As illustrated in FIG. 6, the three-dimensional image transformation 608 can visualize, for example, color and/or texturize, the output image in the two-dimensional equidistant image space 614 in accordance with the one or more intensity values, or brightness values, of the input image in the two-dimensional cubemap image space 610. As illustrated in FIG. 3, the three-dimensional image transformation 608 can map the one or more intensity values, or brightness values, of the two-dimensional coordinates of the input image in the two-dimensional cubemap image space 610 onto two-dimensional coordinates of the output image in the two-dimensional equidistant image space 614 in a substantially similar manner as described above in FIG. 1 through FIG. 4. Thereafter, the three-dimensional image transformation 608 can provide the output image in the two-dimensional equidistant image space 614 as an output image 516.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A computer system for transforming an input image among a plurality of two-dimensional image spaces, the computer system comprising:
   a memory configured to store the input image in a first two-dimensional image space from among the plurality of two-dimensional image spaces; and
   a processor, configured to execute instructions stored in the memory, the instructions, when executed by the processor, configuring the processor to:
      transform the input image from the first two-dimensional image space to a three-dimensional image space,
      transform the three-dimensional image space to a second two-dimensional image space from among the plurality of two-dimensional image spaces to generate an output image, and
      visualize the output image in the second two-dimensional image space.

2. The computer system of claim 1, wherein the instructions, when executed by the processor, configure the processor to:
   transform a first plurality of two-dimensional coordinates of the input image from the first two-dimensional image space to a plurality of three-dimensional coordinates of the three-dimensional image space; and
   transform the plurality of three-dimensional coordinates of the three-dimensional image space to a second plurality of two-dimensional coordinates of the second two-dimensional image space to generate the output image.

3. The computer system of claim 2, wherein the instructions, when executed by the processor, configure the processor to:
   project the plurality of three-dimensional coordinates onto the first plurality of two-dimensional coordinates to map the input image from the first two-dimensional image space to the three-dimensional image space; and
   project the second plurality of two-dimensional coordinates onto the plurality of three-dimensional coordinates to map the output image from the three-dimensional image space to the second two-dimensional image space.

4. The computer system of claim 3, wherein the instructions, when executed by the processor, configure the processor to project the plurality of three-dimensional coordinates onto the first plurality of two-dimensional coordinates using a mathematical forward projection function.

5. The computer system of claim 4, wherein the mathematical forward projection function comprises an equirectangular projection function, an equidistant fisheye projection function, an equisolid fisheye projection function, a stereographic fisheye projection function, an equiangular cubemap projection function, or a latitude/longitude projection function.

6. The computer system of claim 3, wherein the instructions, when executed by the processor, configure the processor to project the second plurality of two-dimensional coordinates onto the plurality of three-dimensional coordinates using a mathematical reverse projection function.

7. The computer system of claim 6, wherein the mathematical reverse projection function comprises an equirectangular projection function or a fisheye projection function.

8. The computer system of claim 1, wherein the instructions, when executed by the processor, configure the processor to color or to texturize the output image in the second two-dimensional image space in accordance with a plurality of intensity values of the input image in the first two-dimensional image space.

9. The computer system of claim 8, wherein the instructions, when executed by the processor, configure the processor to map the plurality of intensity values of a first plurality of pixels of the input image in the first two-dimensional image space onto corresponding pixels from among a second plurality of pixels of the output image in the second two-dimensional image space.

10. A method for transforming an input image among a plurality of two-dimensional image spaces, the method comprising:
    retrieving, by a computer system, the input image in a first two-dimensional image space from among the plurality of two-dimensional image spaces;
    transforming, by the computer system, a first plurality of two-dimensional coordinates of the input image from the first two-dimensional image space to a plurality of three-dimensional coordinates of a three-dimensional image space;
    transforming, by the computer system, the plurality of three-dimensional coordinates of the three-dimensional image space to a second plurality of two-dimensional coordinates of a second two-dimensional image space from among the plurality of two-dimensional image spaces to generate an output image; and
    mapping, by the computer system, one or more intensity values of the input image in the first two-dimensional image space onto the output image in the second two-dimensional image space to visualize the output image in the second two-dimensional image space.

11. The method of claim 10, wherein the transforming the first plurality of two-dimensional coordinates of the input image comprises projecting the plurality of three-dimensional coordinates onto the first plurality of two-dimensional coordinates to map the input image from the first two-dimensional image space to the three-dimensional image space, and
    wherein the transforming the plurality of three-dimensional coordinates of the three-dimensional image space comprises projecting the second plurality of two-dimensional coordinates onto the plurality of three-dimensional coordinates to map the output image from the three-dimensional image space to the second two-dimensional image space.

12. The method of claim 11, wherein the projecting the plurality of three-dimensional coordinates comprises projecting the plurality of three-dimensional coordinates onto the first plurality of two-dimensional coordinates using a mathematical forward projection function.

13. The method of claim 12, wherein the mathematical forward projection function comprises an equirectangular projection function, an equidistant fisheye projection function, an equisolid fisheye projection function, a stereographic fisheye projection function, an equiangular cubemap projection function, or a latitude/longitude projection function.

14. The method of claim 11, wherein the projecting the second plurality of two-dimensional coordinates comprises projecting the second plurality of two-dimensional coordinates onto the plurality of three-dimensional coordinates using a mathematical reverse projection function.

15. The method of claim 14, wherein the mathematical reverse projection function comprises an equirectangular projection function or a fisheye projection function.

16. A computer system for transforming an input image among a plurality of two-dimensional image spaces, the computer system comprising:
   a memory configured to store the input image in a first two-dimensional image space from among the plurality of two-dimensional image spaces; and
   a processor, configured to execute instructions stored in the memory, the instructions, when executed by the processor, configuring the processor to:
      project a plurality of three-dimensional coordinates of a three-dimensional image space onto a first plurality of two-dimensional coordinates of the input image from the first two-dimensional image space,
      project a second plurality of two-dimensional coordinates of a second two-dimensional image space from among the plurality of two-dimensional image spaces onto the plurality of three-dimensional coordinates of the three-dimensional image space to generate an output image, and
      map a plurality of intensity values of a first plurality of pixels of the input image in the first two-dimensional image space onto corresponding pixels from among a second plurality of pixels of the output image in the second two-dimensional image space.

17. The computer system of claim 16, wherein the instructions, when executed by the processor, configure the processor to project the plurality of three-dimensional coordinates onto the first plurality of two-dimensional coordinates using a mathematical forward projection function.

18. The computer system of claim 17, wherein the mathematical forward projection function comprises an equirectangular projection function, an equidistant fisheye projection function, an equisolid fisheye projection function, a stereographic fisheye projection function, an equiangular cubemap projection function, or a latitude/longitude projection function.

19. The computer system of claim 16, wherein the instructions, when executed by the processor, configure the processor to project the second plurality of two-dimensional coordinates onto the plurality of three-dimensional coordinates using a mathematical reverse projection function.

20. The computer system of claim 19, wherein the mathematical reverse projection function comprises an equirectangular projection function or a fisheye projection function.

* * * * *

UNITED STATES PATENT AND TRADEMARK OFFICE
CERTIFICATE OF CORRECTION

| | | |
|---|---|---|
| PATENT NO. | : 12,380,644 B2 | Page 1 of 1 |
| APPLICATION NO. | : 18/601005 | |
| DATED | : August 5, 2025 | |
| INVENTOR(S) | : Nolan et al. | |

It is certified that error appears in the above-identified patent and that said Letters Patent is hereby corrected as shown below:

On the Title Page

Column 1, in Item (73), under "Assignee", Lines 1-2, delete "CSC Holdings, LLC, Bethpage, NY (US)" and insert -- Sphere Entertainment Group, LLC, New York, NY (US) --, therefor.

Signed and Sealed this
Eighteenth Day of November, 2025

John A. Squires
*Director of the United States Patent and Trademark Office*